(12) United States Patent
Suzuki

(10) Patent No.: US 8,866,665 B2
(45) Date of Patent: Oct. 21, 2014

(54) OBSTACLE DETECTION APPARATUS

(75) Inventor: Koji Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 319 days.

(21) Appl. No.: 13/575,885

(22) PCT Filed: Jan. 28, 2010

(86) PCT No.: PCT/JP2010/051113
§ 371 (c)(1),
(2), (4) Date: Jul. 27, 2012

(87) PCT Pub. No.: WO2011/092813
PCT Pub. Date: Aug. 4, 2011

(65) Prior Publication Data
US 2012/0319888 A1    Dec. 20, 2012

(51) Int. Cl.
| | | |
|---|---|---|
| *G01S 13/00* | (2006.01) |
| *G01S 13/34* | (2006.01) |
| *G01S 13/48* | (2006.01) |
| *G01S 13/93* | (2006.01) |
| *G08G 1/16* | (2006.01) |
| *G01S 13/44* | (2006.01) |
| *G01S 13/42* | (2006.01) |

(52) U.S. Cl.
CPC ............... *G08G 1/16* (2013.01); *G01S 13/345* (2013.01); *G01S 13/424* (2013.01); *G01S 13/48* (2013.01); *G01S 13/931* (2013.01); *G01S 13/4454* (2013.01)
USPC ............................. 342/79; 342/107; 342/146

(58) Field of Classification Search
CPC ...... G01S 13/424; G01S 13/48; G01S 13/931
USPC ............................................ 342/79, 107, 146
See application file for complete search history.

(56) References Cited

U.S. PATENT DOCUMENTS

| | | | |
|---|---|---|---|
| 4,740,045 A * | 4/1988 | Goodson et al. | 342/112 |
| 6,246,365 B1 | 6/2001 | Tokoro | |
| 7,460,951 B2 * | 12/2008 | Altan et al. | 701/536 |

FOREIGN PATENT DOCUMENTS

| | | |
|---|---|---|
| JP | A-11-287857 | 10/1999 |
| JP | A-2000-258524 | 9/2000 |
| JP | A-2008-151583 | 7/2008 |
| JP | A-2009-31184 | 2/2009 |
| JP | A-2009-265029 | 11/2009 |

OTHER PUBLICATIONS

May 11, 2010 International Search Report issued in International Patent Application No. PCT/JP2010/051113.

* cited by examiner

*Primary Examiner* — Timothy A Brainard
(74) *Attorney, Agent, or Firm* — Oliff PLC

(57) ABSTRACT

Various targets are detected in a more accurate manner. Provision is made for a receiving antenna part that has a plurality of receiving antennas arranged in a horizontal direction with a part thereof being shifted in a vertical direction from the others, and has a plurality of combinations of the receiving antennas, of which each combination detects an azimuth in the horizontal direction and an azimuth in the vertical direction of a target; and detection means that detects the target a plurality of times while changing the combination of the receiving antennas. The detection accuracy of the target can be enhanced by making a comparison between at least two detection results obtained by the detection means.

4 Claims, 5 Drawing Sheets

OBSTACLE DETECTION APPARATUS

TECHNICAL FIELD

The present invention relates to an obstacle detection apparatus.

BACKGROUND ART

There has been known a technique in which eight receiving antennas are arranged in a horizontal direction with the first and the eighth receiving antennas being shifted in an upward direction from the other receiving antennas, and the azimuth in the vertical direction of a target is obtained from a first oblique direction formed by the first receiving antenna and the second receiving antenna, and from a second oblique direction formed by the seventh receiving antenna and the eighth receiving antenna (for example, refer to a first patent document).

In this technique, DBF (digital beam forming) processing is carried out on signals obtained by the first through eighth receiving antennas, so that a distance, a relative speed and a horizontal angle of the target are detected. After that, the azimuth of the target with respect to the first oblique direction and the azimuth of the target with respect to the second oblique direction are respectively detected by the use of a phase monopulse system, and the azimuth in the vertical direction of the target is obtained from two detection results.

However, the detection accuracy and the detectable azimuth of the target change in accordance with the intervals and angles at which the receiving antennas are arranged. Here, the accuracy and the range of detection required vary, for example, between targets at a long distance and at a short distance. In addition, the performance required also varies with traveling conditions, surrounding environments, etc. In cases where the combination of receiving antennas to be used is set in advance, as in the conventional technique, it becomes impossible to exhibit the required performance, depending on conditions or situations.

For example, if the detection accuracy of the azimuth in the vertical direction is low, an iron plate or steel sheet laid on a road will be detected as an obstacle, thus giving rise to a fear that an unnecessary warning or a brake operation may be made, in spite of the fact that a vehicle is able to pass over the iron plate. However, it becomes impossible to detect a wide range of area by means of a radar which is specialized only in the performance or ability of detecting such an iron plate.

PRIOR ART REFERENCES

Patent Documents

[First Patent Document] Japanese patent application laid-open No. H11-287857
[Second Patent Document] Japanese patent application laid-open No. 2008-151583

SUMMARY OF THE INVENTION

Problems to be Solved by the Invention

The present invention has been made in view of the problem as referred to above, and has for its object to provide a technique of detecting a variety of kinds of targets in a more accurate manner.

Means for Solving the Problems

In order to achieve the above-mentioned object, an obstacle detection apparatus according to the present invention adopts the following means.

That is, an obstacle detection apparatus according to the present invention comprising:

a receiving antenna part that has a plurality of receiving antennas arranged in a horizontal direction with a part thereof being shifted in a vertical direction from the others, and has a plurality of combinations of the receiving antennas, of which each combination detects an azimuth in the horizontal direction and an azimuth in the vertical direction of a target; and detection unit that detects the target a plurality of times while changing the combination of said receiving antennas.

Here, it is possible to detect an azimuth of the target with respect to an oblique direction by using two receiving antennas comprising one of the receiving antennas which are arranged in the horizontal direction, and one of the receiving antennas which are arranged shifted in the vertical direction. That is, it is possible to detect an azimuth of the target with respect to a direction in which these two receiving antennas are arranged. Then, if there are at least two combinations of the receiving antennas of which the angles of arrangement are different from each other, it is possible to detect the azimuth in the horizontal direction and the azimuth in the vertical direction of the target.

Then, if there are a plurality of combinations of the receiving antennas of which the angles of arrangement are different from one another, there will be a plurality of combinations of the receiving antennas which can detect the azimuth in the horizontal direction and the azimuth in the vertical direction of the target. In addition, the detection unit can detect the target a plurality of times while changing the combination of the receiving antennas.

Here, in a monopulse system, in cases where the azimuth of the target is obtained from two receiving antennas, for example, the range in which the target can be detected and the detection accuracy of the target change depending upon the distance (interval) between the receiving antennas. For example, the narrower the interval of the receiving antennas, the wider becomes the angle at which the target can be detected, but the lower becomes the detection accuracy of the target. On the contrary, the wider the interval of the receiving antennas, the narrower becomes the angle at which the target can be detected due to phase return, but the higher becomes the detection accuracy of the target. In addition, in a combination of the receiving antennas which are arranged in an oblique direction, the closer to the vertical direction the direction of arrangement of the receiving antennas, the higher becomes the accuracy of detection with which the azimuth in the vertical direction of the target can be obtained.

In this manner, the detection accuracy of the target and the range in which the target can be detected change depending upon the direction of arrangement or the interval of arrangement of the receiving antennas. As a result, when the target is detected a plurality of times, while changing the combination of the receiving antennas, it is possible to detect the target according to a variety of conditions.

For example, in cases where a vehicle runs on a highway with a bridge existing at a relatively far distance and passing over the highway, this bridge is detected. That is, the bridge or the like has a relatively wide surface, so a reception level therefor becomes high and it is easy to detect such a bridge. However, it is not necessary to immediately respond to this, which is at a long distance. In addition, even if accurate detection is carried out in such a long distance range, processing will only become complicated. That is, in the long distance case, it is better to be able to detect a wide range, even though accuracy is low.

On the other hand, in the case of an iron plate or the like which is laid on a road, if such an iron plate is so thin as a subject (own) vehicle can pass over it, the reception level therefor is small, and the iron plate can not be detected until the distance of the vehicle to the iron plate becomes relatively short. Here, in the case of a target existing at a relatively near distance, there is a fear of collision if the driver of the vehicle does not respond to this immediately. However, the iron plate or the like does not have a fear of collision, and hence, it is desired to detect with high accuracy whether the thickness of the iron plate or like is within a range in which the subject vehicle can pass over it. For such a reason, in the case of the target existing at a short distance, high detection accuracy is better even though only a narrow range can be detected. Thus, even in cases where the required performance varies according to the distance of the target, it can be dealt with by detecting the target a plurality of times while changing the combination of the receiving antennas.

In addition, the detection accuracy of the target can be enhanced, for example, by making a comparison between at least two detection results obtained by the detection unit. For example, in cases where the target is detected by using two receiving antennas, if there exist a plurality of targets with the same relative speed at the same distance, the radar waves received from these objects will be combined with one another so that it may become impossible to detect the targets in an accurate manner. In addition, it may also become impossible to detect the targets in an accurate manner due to phase return of the waves. Even in these cases, the detection accuracy of the targets can be enhanced by making a comparison between at least two detection results obtained by the detection unit.

Moreover, in the present invention, said detection unit can detect a target by using a combination of receiving antennas with an interval of arrangement thereof which is wider in accordance with the shorter distance thereof to the target.

Here, the receiving antennas arranged at a wide interval can detect the azimuth of the target with a high degree of accuracy. For example, by using a combination of receiving antennas arranged at a wide interval with the direction of arrangement thereof being oblique, the azimuth in the vertical direction of the target can be detected with a high degree of accuracy.

For example, in cases where the target over which the subject vehicle can pass is an iron plate or the like which is laid on a road surface, a surface of the iron plate on which radar waves are reflected is a surface in a thickness direction of the iron plate, and hence, when the target is at a long distance, the reception level of the radar waves becomes small or low. For this reason, with the target being at a long distance, the detection accuracy thereof becomes low. On the other hand, even if the target at a long distance is large, it will take time for the vehicle to come near the target, so detection accuracy may be low in many cases. Then, with respect to the target which exists at a long distance, it is not necessary to apply a brake for collision avoidance, and it is enough just to warn the driver. That is, for a long distance, a wide range should just be detected by means of the receiving antennas arranged at a narrow interval.

In contrast to this, for a short distance, even in the case of a thin target such as an iron plate, etc., the reception level becomes large. Here, in cases where the target exists at a short distance, a high degree of detection accuracy is required for the target. For example, in cases where the target exists at a short distance, if it has a fear of collision, the driver has to perform control to avoid a collision immediately. On the contrary, if the control to avoid a collision is carried out for a target such as an iron plate or the like, unnecessary control will be made. Thus, for a short distance, detection with higher accuracy is required. In this case, receiving antennas with a wider interval should just be selected.

Moreover, for example, in cases where the subject vehicle goes straight on, when no obstacle exists in a narrow range in the direction of movement of the subject vehicle, there will be no problem in a short distance from the subject vehicle. In this case, for example, even if a bridge existing at a long distance is detected, when the subject vehicle comes to very near the bridge, the bridge existing above the subject vehicle is not detected by means of a radar, but there will be no fear that the subject vehicle may collide with the bridge, and hence, it is all right not to detect the bridge.

In this manner, by detecting the target with the use of a combination of the receiving antennas with an interval of arrangement which is wider in accordance with the shorter distance to the target, the detection of the target can be made by the use of an optimal combination.

Further, in the present invention, said detection unit can change the combination of the receiving antennas in accordance with the distance of the target to be detected.

That is, when the distance of the target has been detected, the target is detected once again by changing the combination of the receiving antennas in accordance with the distance thus detected. As described above, accurate detection of the target may be wanted or unwanted depending upon the distance of the target. For example, when the target is detected by using a combination of receiving antennas with a narrow interval, in cases where the distance to the target is near, the target is detected again by the use of a combination of receiving antennas with a wide interval. As a result of this, an optimal combination can be selected in accordance with the distance of the target.

In addition, in cases where the interval of the receiving antennas is ½ or more of the wave length of a center frequency, the position of the target may be detected in a shifted manner due to phase return. In this case, it is difficult to determine whether the detected position is correct, only by that combination of the receiving antennas. On the other hand, the target is detected by using a combination of receiving antennas with a wider interval, and at this time, if the target is detected at the same position, it can be judged that the detected position is a correct position, whereas if detected in a different position, it can be judged that the detected position is an incorrect position. Moreover, in cases where it is judged that the position has been detected in a shifted manner, the correct position can be calculated, and hence, the position of the target can be specified by the use of a combination of receiving antennas with a wide interval.

Here, note that a rough azimuth of the target may be first detected by the use of a combination of receiving antennas with a narrow interval, and thereafter, the target may be detected in an accurate manner by the use of a combination of receiving antennas with a wide interval. This sequence of detection may be reversed.

Moreover, in the present invention, said detection unit can change the combination of the receiving antennas in accordance with the speed of the subject vehicle. Here, the faster the speed of the subject vehicle, the more early the subject vehicle will collide with the target, and hence, the more accurate combination of receiving antennas is required.

Further, in the present invention, three or more of said receiving antennas are arranged in the horizontal direction, and said detection unit can detect the azimuth in the horizontal direction of the target by using the three or more receiving antennas arranged in the horizontal direction, and thereafter, detects the azimuth in the vertical direction of the target by using the receiving antennas arranged shifted in the vertical direction.

By means of the three or more receiving antennas arranged in the horizontal direction, the azimuth of the target with respect to the horizontal direction can be detected. At this time, high resolution processing other than the monopulse system can be used. By detecting the azimuth of the target with respect to the horizontal direction with the use of the three or more receiving antennas, it is possible to detect the azimuth in the horizontal direction of the target in a more accurate manner. Then, by using those receiving antennas which are arranged in an oblique direction, the azimuth in the vertical direction of the target can be detected. The three-dimensional coordinates of the target can be specified from this azimuth in the vertical direction of the target, the distance to the target, and so on. That is, when using the three or more receiving antennas arranged in the horizontal direction, the azimuth in the horizontal direction of the target can be detected with a higher degree of accuracy than that in the case where two receiving antennas arranged in the horizontal direction are used. Thus, after first detecting the azimuth in the horizontal direction of the target with a high degree of accuracy, the azimuth in the vertical direction of the target can be obtained by using the receiving antennas arranged shifted in the vertical direction. Then, by detecting the azimuths in the horizontal direction and in the vertical direction of the target a plurality of times while changing the combination of receiving antennas, and by comparing these azimuths thus obtained with each other, it is possible to further enhance the detection accuracy of the target.

In addition, in the present invention, said detection unit can change said combination in accordance with a period of time until the target collides therewith, which is obtained based on the relative speed and the distance of the target.

By dividing the distance of the target by the relative speed thereof, the period of time (TTC) until the subject vehicle collides with the target can be estimated. The shorter this period of time, with the higher degree of accuracy the target is required to be detected. That is, in cases where the period of time until the subject vehicle collides with the target is short, the target should just be detected with a high degree of accuracy by using a combination of receiving antennas with a wider interval. On the other hand, in cases where the period of time until the subject vehicle collides with the target is long, if a rough position of the target has been grasped and it has been detected whether the target exists in a wide range, by using a combination of receiving antennas with a narrower interval, it will become easy to newly detect other targets. For example, after changing the combination of receiving antennas based on the TTC detected in any combination of receiving antennas, the target may be detected again.

Here, note that in cases where there is provided a system which serves to cause the subject vehicle to follow another preceding vehicle running ahead thereof, while maintaining a predetermined distance therebetween, said combination may be changed in accordance with a period of time until the another vehicle approaches the predetermined distance.

Moreover, in the present invention, said combination can be changed in accordance with the kind of driving operation support system for supporting a driver.

The driving support system is, for example, a system which serves to control a vehicle instead of a driver, or to protect a driver in preparation for a collision. In these systems, the distance and the azimuth required to detect the target are different, respectively, so an optimal combination of receiving antennas is accordingly different for each system. Thus, by changing the combination of receiving antennas in accordance with these systems, an optimal combination corresponding to each system can be selected.

Here, note that said driving support system may be at least one of a pre-crash safety system which serves to avoid a collision or to reduce damage of a collision, a preceding vehicle follow-up control system which serves to cause a subject vehicle to follow another preceding vehicle running ahead thereof, while maintaining a predetermined distance therebetween, and a lane keep assist system which serves to prevent a subject vehicle from departing from a lane in which it runs.

A plurality of these systems may be provided, and the combination of receiving antennas may be changed in accordance with each system. Also, one of these systems may be provided, and a combination of receiving antennas corresponding to that system may be used. Even in either of these cases, the combination of receiving antennas can be changed in each system, thereby making it possible to enhance accuracy.

Further, in the present invention, said detection unit can change said combination in accordance with a surrounding environment.

As the surrounding environment, there can be mentioned, for example, the shape of a road, the relation between the road on which the subject vehicle runs and other roads, etc. For example, there is a fear that other vehicles and persons may dart out of right and left at an intersection, so they can be detected by using a combination of receiving antennas capable of detecting a wider angle range. The surrounding environment can also be obtained by means of a radar, or a navigation system, for example.

In addition, for example, when the subject vehicle is going to turn to the right or to the left, the direction of movement of the vehicle changes to a large extent, so the range in which the detection of a target is required also changes to a large extent. At this time, the range of detection should just be changed according to the direction of movement. The same is also true in cases where the vehicle runs a curve. For example, in cases where a direction indictor of the subject vehicle is operated, a combination of receiving antennas may also be selected which can detect a wide angle range including that direction.

Moreover, the combination of receiving antennas may be changed depending upon whether the subject vehicle runs on a general (ordinary) road or on a highway, for example. For example, on the highway, there exist many bridges crossing thereover, signboards and so on, so there are many opportunities to detect long distance targets. For this reason, the targets should just be detected by more often using combinations of receiving antennas with narrow intervals. Even in such cases, it is possible to further enhance accuracy by using combinations of receiving antennas with wide intervals in combination herewith.

Effect of the Invention

According to the present invention, it is possible to detect a variety of kinds of objects with a higher degree of accuracy.

MODES FOR CARRYING OUT THE INVENTION

Hereinafter, reference will be made to specific embodiments of an obstacle detection apparatus according to the present invention based on the attached drawings.

First Embodiment

Figure 1:
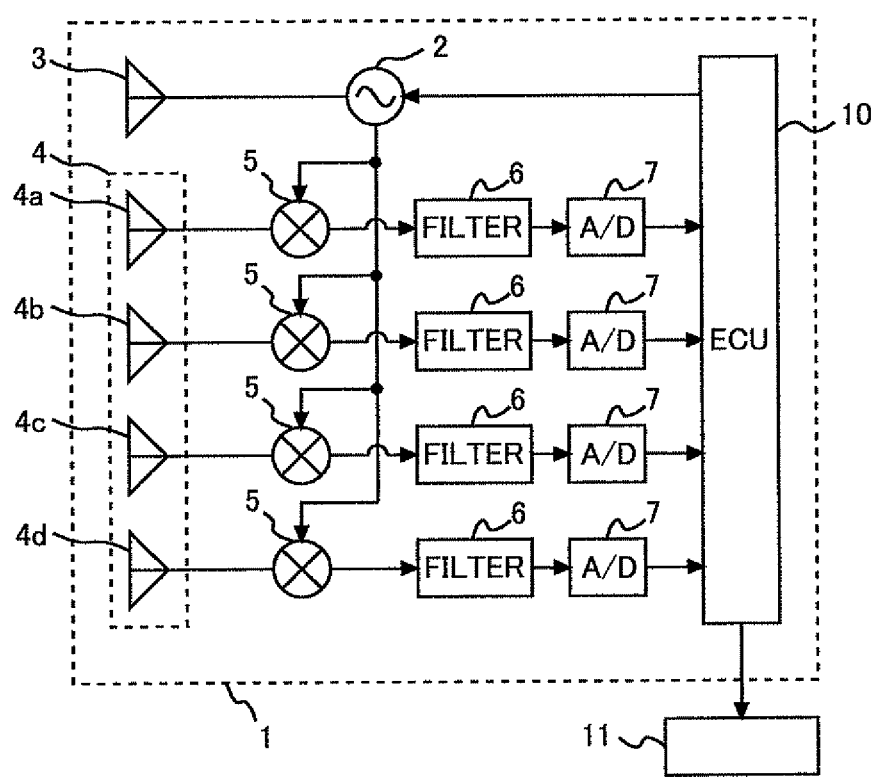
FIG. 1 is a schematic construction view of an obstacle detection apparatus according to an embodiment of the present invention.

FIG. 1 is a schematic construction view of an obstacle detection apparatus 1 according to this first embodiment of the present invention. This obstacle detection apparatus 1 is mounted on a front portion of a vehicle, and serves to detect that a target exists ahead of the own vehicle, and to further detect a distance to the target, a relative speed and an azimuth of the target, etc. Millimeter waves are used as transmission radio waves. The obstacle detection apparatus 1 is constructed to include an oscillator 2, a transmitting antenna 3, a receiving antenna part 4, mixers 5, filters 6, ND converters 7, and an ECU 10.

The oscillator 2 oscillates at frequencies in a millimeter wave band with its center frequency of F0 (e.g., 76.5 GHz), and outputs a signal which has been subjected to frequency modulation in such a manner that its frequency changes in the shape of a triangular wave. The transmitting antenna 3 transmits radar waves in accordance with the transmission signal from the oscillator 2.

The receiving antenna part 4 receives reflected waves which are a part of the radar waves transmitted from the transmitting antenna 3 and reflected by an object. The receiving antenna part 4 is an array antenna, and is composed of a first receiving antenna 4a, a second receiving antenna 4b, a third receiving antenna 4c, and a fourth receiving antenna 4d. Then, the individual receiving antennas 4a, 4b, 4c, 4d are each constructed by a plurality of patch antennas which are arranged in a vertical direction. The arrangement of the receiving antennas 4a, 4b, 4c, 4d will be described later. Here, note that in this embodiment, the first receiving antenna 4a, the second receiving antenna 4b, the third receiving antenna 4c, and the fourth receiving antenna 4d correspond to receiving antennas in the present invention. Also, note that there should just be three or more receiving antennas.

The mixers 5 are provided for the individual receiving antennas 4a, 4b, 4c, 4d, respectively, and local signals from the oscillator 2 are inputted to the individual mixers 5, respectively. Reception signals from the individual receiving antennas 4a, 4b, 4c, 4d are mixed with these local signals, respectively, so that they are down converted into intermediate frequencies. Beat signals (difference signals of the transmission signals and the reception signals, respectively) are obtained by the down conversion.

The filters 6 are provided for the individual receiving antennas 4a, 4b, 4c, 4d, respectively, so that they remove unnecessary signal components from the outputs of the individual mixers 5, respectively. The A/D converters 7 are also provided for the individual receiving antennas 4a, 4b, 4c, 4d, respectively, so that they generate reception data by sampling the outputs of the individual filters 6, respectively.

The ECU 10 is constructed to include a CPU which executes programs, a ROM in which the programs to be executed by the CPU and data tables are stored, a RAM which is used as a working area, an input and output interface, and so on. For example, the ECU 10 activates the oscillator 2 so that it carries out processing to calculate the position and the relative speed of the target based on individual reception data which are obtained during the operation of the oscillator 2. Moreover, the ECU 10 controls a warning device 11 based on individual pieces of information on the azimuth, distance and relative speed of the target detected. The warning device 11 is a device which serves to warn the existence of an obstacle to the driver of the vehicle by the use of sound or light. Here, note that a seat belt pretensioner, an air bag, a brake, a throttle valve, or the like may be driven in accordance with the azimuth, distance and relative speed of the target.

Here, a triangular wave modulation FM-CW method will be described. When the beat frequency at the time when the relative speed is zero is FR, the Doppler frequency based on the relative speed is FD, the beat frequency in a zone in which the frequency increases (up zone) is FB1, and the beat frequency in a zone in which the frequency decreases (down zone) is FB2, the following relations hold.

$FB1=FR-FD$ $FB2=FR+FD$

Accordingly, by separately measuring the beat frequencies FB1 and FB2 in the up zone and the down zone of a modulation cycle, FR and FD can be obtained from the following equations.

$FR=(FB1+FB2)/2$ $FD=(FB2-FB1)/2$

Then, when FR and FD are found, the distance R and the speed V of the target can be obtained by the following equations.

$R=(C/(4\times\Delta F\times FM))\times FR$ $V=(C/(2\times F0))\times FD$ where C is the speed of light; FM is an FM modulation frequency; ΔF is a modulation width; and F0 is the center frequency.

Then, the azimuth of the target can be calculated according to the phase monopulse system. Here, referring, as an example, to the case where reflected waves are detected which are incident to two receiving antennas at an angle θ from their front surfaces, an azimuth angle θ of the target is calculated based on the following equation from a phase difference φ of the reflected waves received by both of the receiving antennas.

$\theta=\sin^{-1}(\lambda\phi/2\pi D)$ where D is the interval of both the receiving antennas, and λ is the wave length of the transmission pulses.

However, when the interval D of both the receiving antennas is set as a value longer than λ/2, a return of phase occurs, and the azimuth angle θ of the target becomes any of a plurality of candidates which are represented by the following equation, and hence, is not decided uniquely.

$\theta=\sin^{-1}\{\lambda(\phi+2\pi K)/2\pi D\}(K=0,1,2,\ldots)$.

Accordingly, in this embodiment, the azimuth of the target is specified by the use of a plurality of combinations of the receiving antennas 4a, 4b, 4c, 4d which give oblique directions.

Figure 2:
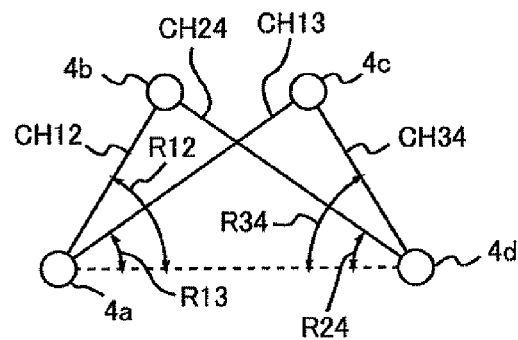
FIG. 2 is a view showing an arrangement of receiving antennas according to a first embodiment of the present invention.

FIG. 2 is a view showing an arrangement of the receiving antennas according to this first embodiment of the present invention. The first receiving antenna 4a, the second receiving antenna 4b, the third receiving antenna 4c, and the fourth receiving antenna 4d are arranged on the same plane. Here, note that FIG. 2 shows the center points of the individual receiving antennas 4a, 4b, 4c, 4d, respectively.

In FIG. 2, the fourth receiving antenna 4d is arranged in the horizontal direction of the first receiving antenna 4a. In addition, the third receiving antenna 4c is arranged in the horizontal direction of the second receiving antenna 4b. Moreover, the second receiving antenna 4b and the third receiving antenna 4c are arranged between the first receiving antenna 4a and the fourth receiving antenna 4d in a manner shifted in an upward direction from the first receiving antenna 4a and the fourth receiving antenna 4d. As a result, the second receiving antenna 4b and the third receiving antenna 4c are arranged at locations obliquely upward with respect to the first receiving antenna 4a and the fourth receiving antenna 4d, respectively.

When two of the receiving antennas 4a, 4b, 4c, 4d are selected and combined with each other, combinations in which the direction of arrangement thereof becomes oblique are indicated by solid lines in FIG. 2. That is, as the combinations with the direction of arrangement of the receiving antennas being oblique, four kinds of combinations can be considered which include a combination of the first receiving antenna 4a and the second receiving antenna 4b (referred to as CH12), a combination of the first receiving antenna 4a and the third receiving antenna 4c (referred to as CH13), a combination of the second receiving antenna 4b and the fourth receiving antenna 4d (referred to as CH24), and a combination of the third receiving antenna 4c and the fourth receiving antenna 4d (referred to as CH34).

Then, in FIG. 2, the angles of the directions of arrangements of CH12, CH13, CH24 and CH34 with respect to the horizontal direction are indicated by R12, R13, R24 and R34, respectively. Here, when a comparison is made between CH12 with CH13, the interval of CH12 is narrower and the interval of CH13 is wider. Similarly, when a comparison is made between CH24 with CH34, the interval of CH34 is narrower and the interval of CH24 is wider. That is, it becomes possible for CH12 and CH34 to detect the target in a wider angle range than for CH13 and CH24. On the contrary, it becomes possible for CH13 and CH24 to detect the target in a narrower angle range with higher accuracy than for CH13 and CH24.

Accordingly, in this embodiment, the rough position of the target is first obtained by the use of CH12 and CH34, and then, the position of the target is scrutinized by the use of CH13 and CH24.

Figure 3:
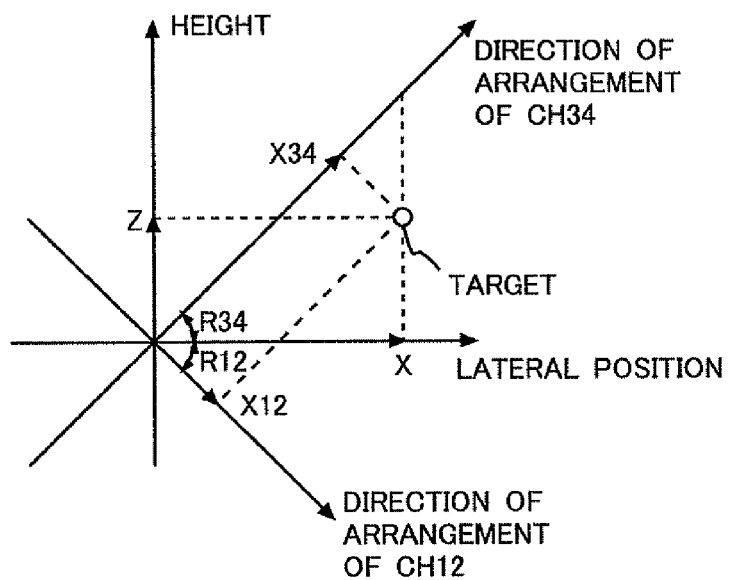
FIG. 3 is a view showing an example of the relation between the directions of arrangements of the receiving antennas and the position of the target, as seen from the back of a vehicle.

Here, FIG. 3 is a view showing an example of the relation between the directions of arrangements of the receiving antennas 4a, 4b, 4c, 4d and the position of the target, as seen from the back of the vehicle. The axis of abscissa represents the lateral or transverse position of the target, which corresponds to the distance thereof in the true lateral or transverse direction of the vehicle. In addition, the axis of ordinate indicates the height of the target in the vertical direction. Then, the axes of coordinates are set with respect to the direction of arrangement of CH12 and the direction of arrangement of CH34, respectively.

First, the lateral position X12 of the target in the direction of arrangement of CH12 is calculated according to the monopulse system. Similarly, the lateral position X34 of the target in the direction of arrangement of CH34 is calculated according to the monopulse system. Then, the height Z and the lateral position X of the target can be calculated according to the following equations.

$$X = X12 \times \cos R12 + X34 \times \cos R34$$

$$Z = X12 \times (-\sin R12) + X34 \times \sin R34$$

Then, the lateral position X13 of the target in the direction of arrangement of CH13 is calculated according to the monopulse system. Similarly, the lateral position X24 of the target in the direction of arrangement of CH24 is calculated according to the monopulse system. Then, the height Z and the lateral position X of the target are calculated according to the following equations.

$$X = X13 \times \cos R13 + X34 \times \cos R24$$

$$Z = X13 \times (-\sin R13) + X34 \times \sin R24$$

Subsequently, the lateral position X and the height Z of the target, which are obtained from CH12 and CH34, are compared with those obtained from CH13 and CH24, respectively. That is, with CH13 and CH24, the detection accuracy of the target is high, but phase return may occur. On the other hand, with CH12 and CH34, if the receiving antennas are arranged in such a manner that phase return does not occur, the detection accuracy will be low, but the position of the target can be detected in a wide angle range. Thus, for example, the rough position of the target is first obtained in a wide angle range, and then, if the position of the target obtained with CH13 or CH24 is near to this position, it can be specified that the position of the target obtained with CH13 or CH24 is the actual position of the target. In addition, in cases where the position of the target obtained with CH13 or CH24 is shifted with respect to that obtained with CH12 or CH34, it can be judged that phase return has occurred. In this case, an amount of that shift can be calculated, so that a position, which is obtained by adding the amount of shift to the position of the target obtained with CH13 or CH24, can be specified as the actual position of the target.

In this manner, by detecting the target while changing the combination of the receiving antennas 4a, 4b, 4c, 4d, it is possible to improve the detection accuracy of the target. As a result of this, even if an iron plate or the like with almost no height is laid on the road, it is not identified as an obstacle, so it is possible to suppress an unnecessary warning from being made.

Figure 4:
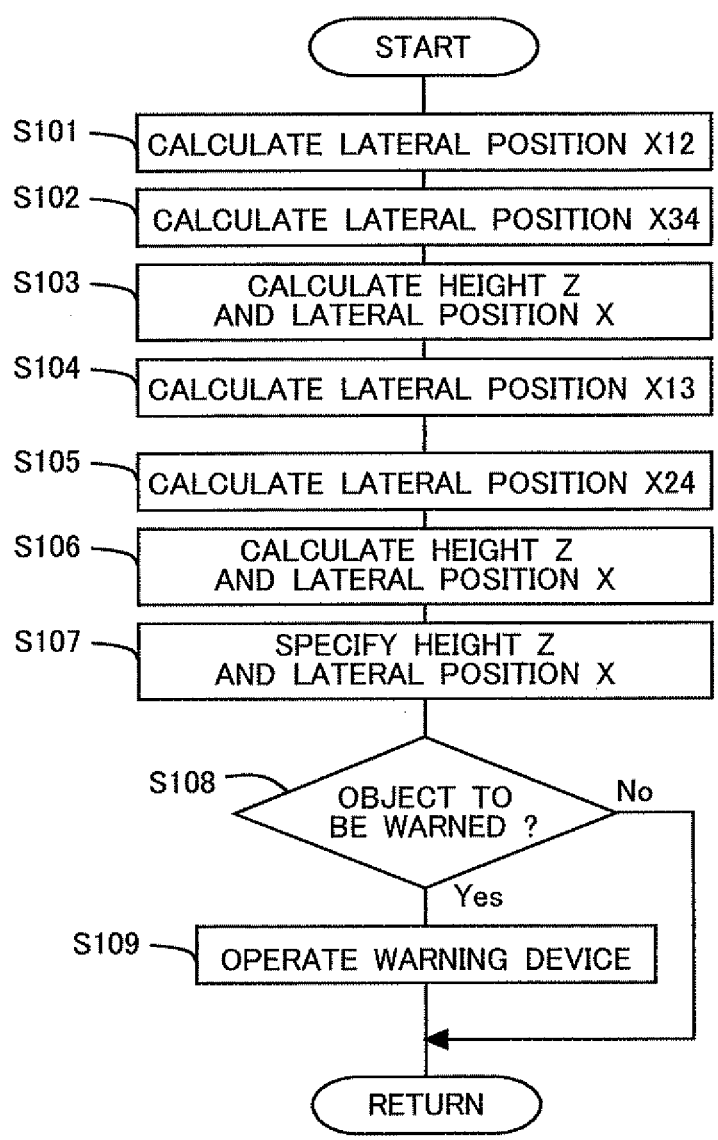
FIG. 4 is a flow chart showing a target detection flow according to the first embodiment of the present invention.

Next, FIG. 4 is a flow chart showing a target detection flow or routine according to this embodiment. This routine is carried out by means of the ECU 10 in a repeated manner.

In step S101, the ECU 10 calculates the lateral position X12 of the target in the direction of arrangement of CH12 from the first receiving antenna 4a and the second receiving antenna 4b according to the monopulse system.

In step S102, the ECU 10 calculates the lateral position X34 of the target in the direction of arrangement of CH34 from the third receiving antenna 4c and the fourth receiving antenna 4d according to the monopulse system.

In step S103, the ECU 10 calculates the height Z and the lateral position X of the target from the lateral position X12 of the target in the direction of arrangement of CH12 and the lateral position X34 of the target in the direction of arrangement of CH34.

In step S104, the ECU 10 calculates the lateral position X13 of the target in the direction of arrangement of CH13 from the first receiving antenna 4a and the third receiving antenna 4c according to the monopulse system.

In step S105, the ECU 10 calculates the lateral position X24 of the target in the direction of arrangement of CH24 from the second receiving antenna 4b and the fourth receiving antenna 4d according to the monopulse system.

In step S106, the ECU 10 calculates the height Z and the lateral position X of the target from the lateral position X13 of the target in the direction of arrangement of CH13 and the lateral position X24 of the target in the direction of arrangement of CH24.

In step S107, the ECU 10 makes a comparison between the height Z of the target calculated in step S103 and that calculated in step S106, and specifies the height Z of the target. Here, note that in this embodiment, the ECU 10, which carries out the processing of step S101 through step S107, corresponds to detection unit in the present invention.

In step S108, the ECU 10 determines whether the target is an object to be warned. That is, it is determined whether the height Z of the target is equal to or larger than a threshold value. Then, in cases where an affirmative determination is made in step S108, i.e., in cases where a determination is made that the target is an object to be warned, the routine goes to step S109, in which the warning device 11 is operated. On the other hand, in cases where a negative determination is made in step S108, i.e., in cases where a determination is made that the target is not an object to be warned, this routine is ended.

As described above, according to this embodiment, by making comparisons between the results of detecting the target a plurality of times while changing the combination of the receiving antennas 4a, 4b, 4c, 4d, it is possible to obtain the height Z of the target with a high degree of accuracy. As a result of this, even if an iron plate or the like over which the vehicle can pass is laid on the road, it is not identified as an obstacle, so it is possible to suppress an unnecessary warning from being made. In addition, by combining a plurality of receiving antennas arranged in an oblique direction, it is possible to reduce the size of the apparatus, as compared with the case where the receiving antennas are arranged in the vertical direction.

Here, note that the height Z and the lateral position X of the target may be calculated based on a combination among the receiving antennas 4a, 4b, 4c, 4d in the horizontal direction and a combination thereof in an oblique direction. For example, the height Z and the lateral position X of the target may be calculated by the use of either one of a combination of the first receiving antenna 4a and the fourth receiving antenna 4d (referred to as CH14) and a combination of the second receiving antenna 4b and the third receiving antenna 4c (referred to as CH23), as well as any one of CH12, CH13, CH24 and CH34, in combination.

Second Embodiment

In this second embodiment, the combination of the receiving antennas 4a, 4b, 4c, 4d is changed in accordance with the distance to the target or the period of time until the vehicle collides with the target. The other devices, parts and so on are the same as those in the first embodiment, so the explanation thereof is omitted. Here, note that the period of time until the vehicle collides with the target (hereinafter referred to as TTC.) is calculated by (the distance/the relative speed).

Specifically, the target is detected by using combinations of the receiving antennas 4a, 4b, 4c, 4d with intervals which become wider in accordance with a shorter distance range to the target or in a shorter TTC range. In the example shown in FIG. 2, a target existing in a range of short distance or in a range in which the TTC is short is detected by the use of CH13 and CH24, whereas a target existing in a range of long distance or in a range in which the TTC is long is detected by the use of CH12 and CH34. This can be said that in the range of short distance, receiving antennas with their intervals in the vertical direction and in the horizontal direction being wider than in the range of long distance are combined with each other. Here, note that the combination of receiving antennas may be changed for each predetermined period of time.

By doing in this manner, in a range in which there is a great fear that the vehicle may collide with a target, it is possible to detect the target with a high degree of accuracy, thereby making it possible to suppress the vehicle from colliding with the target. In addition, even in cases where the target is an iron plate or the like, it is possible to detect such a target with high accuracy, so it is possible to suppress an unnecessary warning, etc., from being carried out.

Third Embodiment

Figure 5:
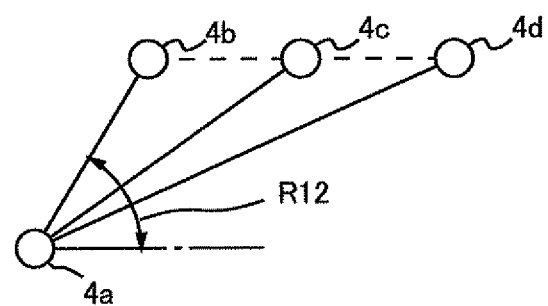
FIG. 5 is a view showing an arrangement of receiving antennas according to a third embodiment of the present invention.

FIG. 5 is a view showing an arrangement of receiving antennas according to this third embodiment of the present invention. In this embodiment, the arrangement of the receiving antennas is different, as compared with the first embodiment. In addition, processing in the ECU 10 at the time of specifying three-dimensional coordinates of a target is different. The other devices, parts and so on are the same as those in the first embodiment, so the explanation thereof is omitted. Here, note that in this third embodiment, the first receiving antenna 4a, the second receiving antenna 4b, the third receiving antenna 4c, and the fourth receiving antenna 4d correspond to receiving antennas in the present invention.

Here, the third receiving antenna 4c and the fourth receiving antenna 4d are arranged in horizontal to the second receiving antenna 4b. Then, the second receiving antenna 4b, the third receiving antenna 4c and the fourth receiving antenna 4d are arranged at locations obliquely upwardly of the first receiving antenna 4a.

When two of the receiving antennas 4a, 4b, 4c, 4d are selected and combined with each other, combinations in which the direction of arrangement thereof becomes oblique are indicated by solid lines in FIG. 5. That is, as combinations which are arranged in oblique directions, there can be considered three kinds of combinations which include a combination of the first receiving antenna 4a and the second receiving antenna 4b (referred to as CH12), a combination of the first receiving antenna 4a and the third receiving antenna 4c (referred to as CH13), and a combination of the first receiving antenna 4a and the fourth receiving antenna 4d (referred to as CH14).

In addition, as horizontal combinations of the receiving antennas 4a, 4b, 4c, 4d, there can also be considered another three kinds of combinations which include a combination of the second receiving antenna 4b and the third receiving antenna 4c (referred to as CH23), a combination of the third receiving antenna 4c and the fourth receiving antenna 4d (referred to as CH34), and a combination of the second receiving antenna 4b and the fourth receiving antenna 4d (referred to as CH24). Moreover, in the horizontal direction, there can also be considered a combination of three receiving antennas, i.e., the second receiving antenna 4b, the third receiving antenna 4c and the fourth receiving antenna 4d (referred to as CH234).

First, an azimuth β of the target with respect to the horizontal direction is calculated from the second receiving antenna 4b, the third receiving antenna 4c and the fourth receiving antenna 4d. That is, the azimuth of the target with respect to the horizontal direction in combination with the determination of the presence or absence of the target is calculated by combining the azimuths of the target which have been obtained based on the phase monopulse system by using CH23, CH34, CH24, or CH234. At this time, an amplitude monopulse system may also instead be adopted. Moreover, high resolution processing such as DBF or MUSIC may also be adopted. In this manner, by detecting the azimuth β of the target with respect to the horizontal direction by the use of the three receiving antennas 4b, 4c, 4d, it is possible to enhance the detection accuracy.

Subsequently, by representing the angle of the direction of arrangement of CH12 with respect to the horizontal direction by R12, an azimuth β' of the target with respect to the direction of arrangement of CH12 is calculated according to the monopulse system. Then, a vertical angle θ, which corresponds to an azimuth in the vertical direction of the target, is calculated by the following equation.

$$\theta = \tan^{-1}\{(\tan \beta \cos R12 - \tan \beta')/\sin R12\}$$

Then, the three-dimensional coordinates of the target can be obtained from the vertical angle θ, the distance to the target, and the azimuth of the target with respect to the horizontal direction. Then, in cases where the height of the target is lower than a threshold value, the target is not identified as an obstacle. As a result of this, even if an iron plate or the like with almost no height is laid on the road, it is not identified as an obstacle, so it is possible to suppress an unnecessary warning from being made.

Figure 6:
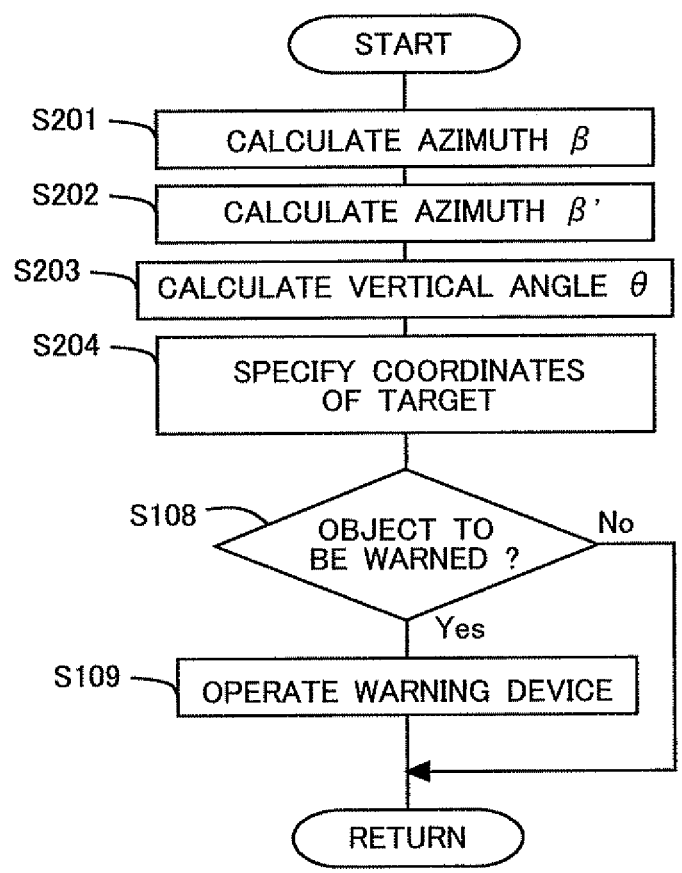
FIG. 6 is a flow chart showing a target detection flow according to the third embodiment of the present invention.

FIG. 6 is a flow chart showing a target detection flow or routine according to this embodiment. This routine is carried out by means of the ECU 10 in a repeated manner. Here, note that for those steps in which the same processing as in the flow shown in FIG. 4 is carried out, the same symbols are attached and an explanation thereof is omitted.

In step S201, the ECU 10 calculates the azimuth β in the horizontal direction of the target from the second receiving antenna 4b, the third receiving antenna 4c and the fourth receiving antenna 4d, according to the phase monopulse system, for example.

In step S202, the ECU 10 calculates the azimuth β' of the target with respect to the direction of arrangement of CH12 from the first receiving antenna 4a and the second receiving antenna 4b according to the monopulse system. After that, the routine advances to step S203. In step S203, the ECU 10 calculates the vertical angle θ of the target, and thereafter, the routine advances to step S204.

In step S204, the ECU 10 specifies the three-dimensional coordinates of the target. In this step, the three-dimensional coordinates of the target are calculated from the vertical angle θ, the azimuth β, and the distance of the target. After that, the routine advances to step S108.

Similarly, the vertical angle θ of the target is calculated by the use of the azimuth of the target with respect to the direction of arrangement of CH13 or CH14 in place of that of CH12. Then, by making a comparison between the vertical angle θ obtained by CH12 and that obtained by CH13 or CH14, it is possible to improve the detection accuracy of the vertical angle θ of the target. Here, note that in this embodiment, the ECU 10, which carries out the processing of step S201 through step S204, corresponds to detection unit in the present invention.

As described above, according to this embodiment, the position in the horizontal direction of a target can be detected with a high degree of accuracy by means of the combination of a plurality of receiving antennas arranged in the horizontal direction. For this reason, even if a plurality of targets exists ahead of the vehicle, they can be detected in an accurate manner. In addition, the height of a target can be obtained with high accuracy by means of the receiving antennas 4a, 4b, 4c, 4d which are arranged in oblique directions. As a result of this, even if an iron plate or the like with almost no height over which the vehicle can pass is laid on the road, it is not identified as an obstacle, so it is possible to suppress an unnecessary warning from being made. Moreover, the apparatus can be reduced in size.

Fourth Embodiment

In this fourth embodiment, a plurality of driving support systems are provided, and the combination of the receiving antennas 4a, 4b, 4c, 4d is changed for each driving support system. The other devices, parts and so on are the same as those in the first embodiment, so the explanation thereof is omitted.

As the driving support systems, there can be mentioned, for example, a system which applies a brake or issues a warning, and further prepares for a collision when there is a fear that a subject (own) vehicle may collide with a target (a pre-crash safety system, hereinafter referred to as PCS), a system which causes the subject vehicle to follow another preceding vehicle running ahead thereof, while maintaining a predetermined distance therebetween (a preceding vehicle follow-up control system, hereinafter referred to as ACC), and a system which prevents the subject vehicle from deviating or departing from a lane (a lane keep assist system, hereinafter referred to as LKA). All of these systems need not be provided. In addition, provision may be made for other driving support systems.

For example, in the PCS, it is desirable not to carry out unnecessary processing such as collision avoidance or the like for a target such as an iron plate, etc., over which the subject vehicle can pass. For that reason, the processing described in the first embodiment or in the second embodiment is carried out in order to increase the detection accuracy of the target in a short distance.

In addition, in the ACC, a combination which can detect the predetermined distance formed between the subject vehicle and another vehicle with a high degree of accuracy is selected. Moreover, in the LKA, for example, by detecting lines drawn on a road, steering control is carried out in such a manner that the subject vehicle can be located within a lane, and hence, the lane should just be detected with high accuracy. That is, an opportunity to detect the target in a narrow angle range by the use of a combination with a wide interval is increased.

In this manner, the distance and the azimuth required to detect the target vary according to the kind of driving support system, so an optimal combination of receiving antennas is accordingly different for each kind of driving support system. Thus, by changing the combination of receiving antennas in accordance with these systems, an optimal combination corresponding to each system can be selected. As a result of this, the precision or accuracy of each driving support system can be improved.

Here, note that in cases where each system is carried out, the opportunity to detect the target by means of an optimal combination of the receiving antennas 4a, 4b, 4c, 4d for the system is increased, and the target is detected by auxiliarily using other combinations. As a result, the detection accuracy of the target can be enhanced. The frequency of change of the combinations of the receiving antennas, and which combination is to be used, may be obtained through experiments, etc.

In addition, in this embodiment, the plurality of driving support systems are provided, but only one of these systems may be provided, and an optimal combination of receiving antennas for that system may be set in advance.

Fifth Embodiment

In this fifth embodiment, the combination of the receiving antennas 4a, 4b, 4c, 4d is changed in accordance with the surrounding environment or the traveling state of the subject (own) vehicle. The other devices, parts and so on are the same as those in the first embodiment, so the explanation thereof is omitted.

For example, when a vehicle is turned to the right or to the left at an intersection, the direction of movement of the vehicle changes to a large extent. In the direction of movement at this time, there may exist other vehicles and persons, so the opportunity to detect targets in a wider angle range is increased. In this case, combinations of the receiving antennas 4a, 4b, 4c, 4d with narrower intervals are used. For example, when the subject (own) vehicle passes through an intersection, the combinations of the receiving antennas 4a, 4b, 4c, 4d with narrower intervals may be used.

The surrounding environment of the subject (own) vehicle can be detected by the use of a navigation system, for example. This navigation system is provided with a GPS device, so that the current position of the subject vehicle can be measured by means of the GPS device. Then, map information has been stored in advance in the navigation system, and the surrounding environment of the subject vehicle can be obtained by checking the current position of the vehicle with reference to the map information.

In addition, for example, when the subject vehicle turns to the right or to the left, or changes its course, or runs a curve, combinations capable of detecting a wider angle range may be selected. Here, the right turn or the left turn of the vehicle can be detected, for example, when the driver of the vehicle operates a direction or turn indictor. Moreover, the direction of movement of the vehicle can also be detected according to the angle of steering.

In this manner, by changing the combination of the receiving antennas 4a, 4b, 4c, 4d in accordance with the surrounding environment or the traveling condition of the subject vehicle, it is possible to select a combination of the receiving antennas 4a, 4b, 4c, 4d corresponding to the environment or condition at that time. Even in such a case, by detecting a target with the auxiliary use of other combinations of the receiving antennas, it is possible to enhance the detection accuracy of the target.

EXPLANATION OF REFERENCE NUMERALS AND CHARACTERS 1 obstacle detection apparatus
2 oscillator
3 transmitting antenna
4 receiving antenna part
4a first receiving antenna
4b second receiving antenna
4c third receiving antenna
4d fourth receiving antenna
5 mixers
6 filters
7 A/D converters
10 ECU
11 warning device

The invention claimed is:

1. An obstacle detection apparatus comprising:
a receiving antenna part that has a plurality of receiving antennas arranged in a horizontal direction with a part thereof being shifted in a vertical direction from the others, and has a plurality of combinations of the receiving antennas, of which each combination detects an azimuth in the horizontal direction and an azimuth in the vertical direction of a target; and
detection unit that detects the target a plurality of times while changing the combination of said receiving antennas;
wherein said detection unit changes the combination of the receiving antennas in accordance with the distance of the target to be detected.

2. The obstacle detection apparatus as set forth in claim 1, wherein said detection unit detects the target by using a combination of receiving antennas with an interval of arrangement thereof which is wider in accordance with the shorter distance thereof to the target.

3. The obstacle detection apparatus as set forth in claim 1, wherein three or more of said receiving antennas are arranged in the horizontal direction, and said detection unit detects the azimuth in the horizontal direction of the target by using the three or more receiving antennas arranged in the horizontal direction, and thereafter, detects the azimuth in the vertical direction of the target by using the receiving antennas arranged shifted in the vertical direction.

4. The obstacle detection apparatus as set forth in claim 1, wherein said detection unit changes said combination in accordance with a period of time until the target collides therewith, which is obtained based on the relative speed and the distance of the target.

* * * * *